(12) United States Patent
Andrei

(10) Patent No.: US 6,260,429 B1
(45) Date of Patent: Jul. 17, 2001

(54) FACE GEAR TRANSMISSION ASSEMBLY, IN PARTICULAR FOR AIRCRAFT APPLICATION

(75) Inventor: Gianluca Andrei, Turin (IT)

(73) Assignee: Fiatavio S.p.A., Turin (IT)

( * ) Notice: Subject to any disclaimer, the term of this patent is extended or adjusted under 35 U.S.C. 154(b) by 0 days.

(21) Appl. No.: 09/419,048

(22) Filed: Oct. 15, 1999

(30) Foreign Application Priority Data

Oct. 16, 1998 (IT) .............................................. TO98A0880

(51) Int. Cl.[7] .............................. F16H 1/22; F16H 55/22
(52) U.S. Cl. ................................. 74/410; 74/411; 74/416; 74/665 C
(58) Field of Search .............................. 74/410, 411, 416, 74/665 C

(56) References Cited

U.S. PATENT DOCUMENTS

| | | |
|---|---|---|
| 3,463,021 * | 8/1969 | Gelb ........................................ 476/11 |
| 5,233,886 | 8/1993 | Bossler, Jr. . |
| 5,974,911 * | 11/1999 | Pias et al. .......................... 74/665 C |

FOREIGN PATENT DOCUMENTS 58-013245    1/1983   (JP) .

* cited by examiner

*Primary Examiner*—Allan D. Herrmann
(74) *Attorney, Agent, or Firm*—Kinney & Lange, P.A.

(57) ABSTRACT

A face gear transmission assembly has a supporting structure, and a pair of face gears which are positioned facing each other, rotate with respect to the supporting structure about a common axis, and both mesh with two input pinions and three transmission pinions; the transmission pinions are supported by an auxiliary frame which provides for maintaining the transmission pinions equally spaced angularly, is connected to the supporting structure in angularly fixed manner about the common axis, and is movable along the common axis and at least in one direction crosswise to the common axis.

13 Claims, 2 Drawing Sheets

FACE GEAR TRANSMISSION ASSEMBLY, IN PARTICULAR FOR AIRCRAFT APPLICATION

The present invention relates to a face gear transmission assembly, in particular for aircraft application.

BACKGROUND OF THE INVENTION

In aircraft applications, motion is known to be transmitted from an input shaft to an output shaft using a face gear transmission assembly, which comprises two coaxial, counter-rotating face gears positioned facing each other, and a transmission pinion meshing with both face gears.

To reduce action at the face gear-transmission pinion mesh points, a number of transmission pinions are used, each of which is normally supported by a respective elastically deformable member permitting movement of the transmission pinion in a circumferential direction of the face gears. That is, each deformable member extends perpendicular to the face gear axes, and is flexible in the plane perpendicular to the face gear axes so as to permit, in use, independent relative movements of the transmission pinions in said perpendicular plane.

Though widely used, by adapting to different operating conditions, known transmissions of the type described above are unsatisfactory in terms of size and weight. This is mainly due to the fact that, in known solutions, the actions or forces exchanged at the various face gear-transmission pinion mesh points and under different operating conditions normally differ in value, are difficult to assess, and are directed in respective directions forming varying angles, which are also unpredictable by depending on the yield or flexural strength of, and the loads transmitted to, the various deformable supporting members used.

As a result, the various actions exchanged are transmitted at least partly and unpredictably onto the face gear supports, and the various parts of the transmission, face gears included, must be sized on the basis of an assumed maximum potential value of such actions, so that, in most applications, the transmission is oversized and therefore excessively heavy, bulky and, above all, expensive.

SUMMARY OF THE INVENTION

It is an object of the present invention to provide a face gear transmission assembly designed to solve the aforementioned problems in a straightforward, low-cost manner.

According to the present invention, there is provided a face gear transmission assembly, in particular for aircraft application, comprising a supporting structure; a pair of face gears facing each other and rotating with respect to the supporting structure about a respective first axis; at least one input pinion and at least two transmission pinions rotating about respective second axes and meshing with both the face gears; and connecting means for connecting said transmission pinions to said supporting structure; characterized in that said connecting means comprise an auxiliary supporting frame for supporting said transmission pinions, and which is movable with respect to the supporting structure and rigid to maintain said second axes in fixed relative positions; and angular connecting means interposed between said supporting structure and said supporting frame to maintain the supporting frame in an angularly fixed position with respect to said supporting structure and about said first axis.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
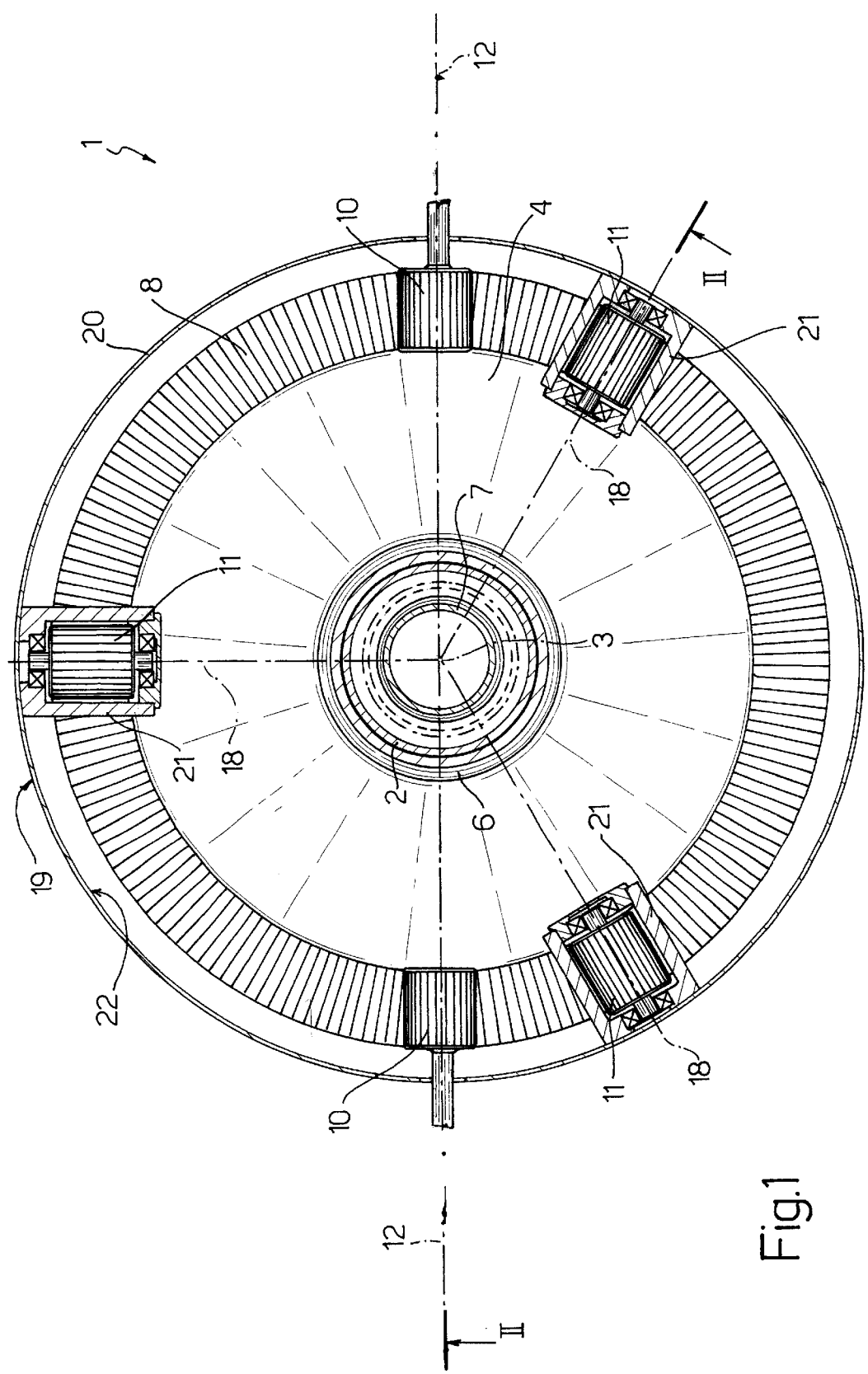
FIG. 1 shows a schematic section of a preferred embodiment of the face gear transmission assembly according to the present invention.

Number 1 in the accompanying drawings indicates a face gear transmission assembly, in particular for aircraft application, interposable between two engines (not shown) and one or more user devices (not shown). Assembly 1 comprises a fixed tubular supporting structure 2 having a respective axis 3; and a pair of face gears 4 and 5, both of which are connected to structure 2 in axially-fixed manner and for rotation about axis 3 by means of respective known bearings 6. Gear 4 is fitted to a main output shaft 7 extending inside structure 2 and coaxially with axis 3; and gears 4 and 5 comprise respective face teeth 8 and 9, which are positioned facing each other, are the same size, and, in the example described, both mesh with a pair of known input pinions 10 located diametrically opposite with respect to axis 3, and with three transmission pinions 11 perfectly equally spaced angularly.

Pinions 10 have respective axes 12 and are fixed or, according to an embodiment not shown, floating cylindrical pinions.

Pinions 11 have respective axes 18 and are connected to structure 2 by a connecting assembly 19 comprising a rigid auxiliary frame 20—preferably defined by an annular body coaxial with axis 3 and surrounding gears 4 and 5—and, for each pinion 11, a respective supporting cage 21, which projects radially inside frame 20 and is connected integrally to an inner surface 22 of frame 20. Each cage 21 houses a respective pinion 11, which is connected in known manner, shown schematically in the accompanying drawings, to cage 21 so as to rotate about and translate along respective axis 18. Inside respective cages 21, pinions 11 are so positioned that respective axes 18 form an angle of 120° and all lie in the same plane P perpendicular to axis 3 and coincident with the FIG. 1 plane.

Figure 2:
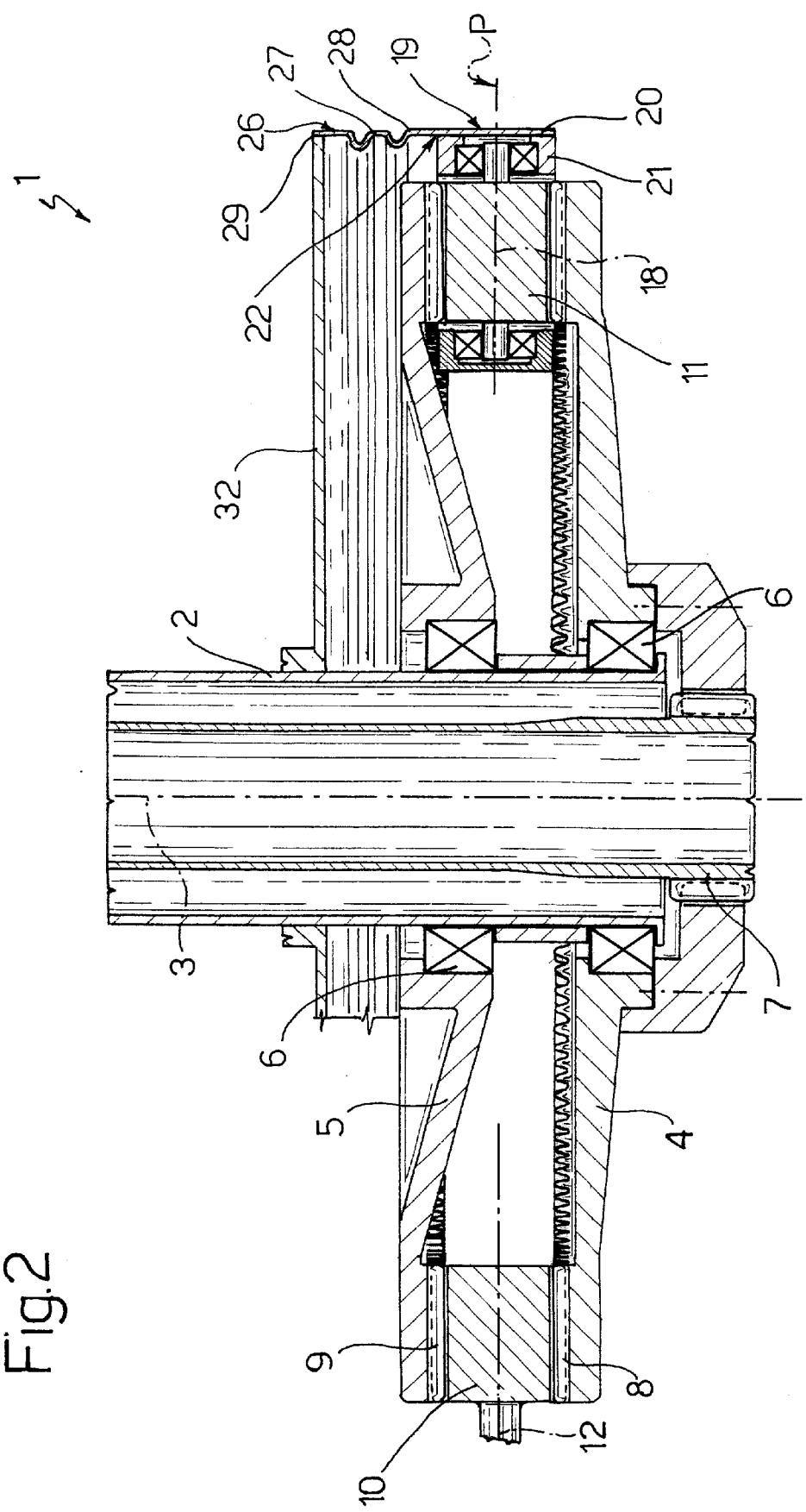
FIG. 2 shows a slightly larger-scale section, with parts removed for clarity, along line II—II in FIG. 1.

As shown in FIG. 1, and particularly in FIG. 2, frame 20 is connected to structure 2 by an elastically flexible tubular body 26, which forms part of assembly 19, extends coaxially with axis 3 and in line with frame 20, and comprises a bellows-type intermediate portion 27, an end portion 28 facing and connected integrally to frame 20, and an opposite end portion 29 connected integrally to structure 2 by an annular flange 32 conveniently welded to structure 2 and also forming part of assembly 19.

Annular flange 32 and tubular body 26 are so sized and so cooperate with each other as to lock frame 20 in an angularly fixed position with respect to structure 2 and about axis 3, while at the same time enabling frame 20 to move, with respect to gears 4 and 5 and structure 2, both in a direction substantially parallel to axis, and in a number of radial directions crosswise to axis 3. Annular flange 32 and tubular body 26 are also so sized as to enable frame 20, and hence plane P containing axes 18, to rock, with respect to structure 2 and gears 4 and 5, about a number of axes crosswise to axis 3.

In actual use, therefore, the particular way in which pinions 11 are connected to one another and to structure 2 provides for maintaining the axes 18 of rotation of pinions 11 not only coplanar at all times, but above all in constant predetermined fixed angular positions with respect to one another, so that pinions 11 are all subjected to practically the same and, above all, to an actual, invariable and easily predictable stress. Sizing both pinions 10, 11 and gears 4, 5 on the basis of actual stress therefore provides for obtaining gears 4 and 5 and pinions 10 and 11, which, on the one hand, provide for safe input torque transmission, and, on the other, are far more lightweight, compact, and, hence, cheaper to produce as compared with known solutions.

Moreover, in transmission assembly 1 as described, the actions to which the various transmission pinions 11 are subjected are directed in directions which are not only coplanar at all times, but also so oriented as to form a closed, i.e. zero-resultant, polygon, regardless of the operating conditions of the transmission. As compared with known solutions, the particular way in which pinions 11 are connected to structure 2 therefore reduces stress on the various supports and, in particular, on the supports of face gears 4 and 5, which, again as compared with known solutions, are far more lightweight and compact and cheaper to produce.

The flexibility of intermediate bellows portion 27 of tubular body 26 therefore enables transmission pinions 11 to be set to the best operating position, regardless of the operating conditions of the transmission.

Clearly, changes may be made to transmission assembly 1 as described herein without, however, departing from the scope of the present invention.

In particular, assembly 1 may comprise a number of transmission pinions 11 other than that indicated by way of example; and transmission pinions 11 may be connected to supporting structure 2 by an elastically flexible, torsionally rigid connecting assembly other than assembly 19 described by way of example. In particular, intermediate bellows portion 27 of tubular body 26 may be replaced by a coiled-wire elastic member similar to an ordinary coil spring.

What is claimed is:

1. A face gear transmission assembly (1) for aircraft application, comprising a supporting structure (2); a pair of face gears (4)(5) facing each other and rotating with respect to the supporting structure (2) about a respective first axis (3); at least one input pinion (10) and at least two transmission pinions (11) rotating about respective second axes (18) and meshing with both the face gears (4)(5); and connecting means (19) for connecting said transmission pinions (11) to said supporting structure (2); characterized in that said connecting means (19) comprise an auxiliary supporting frame (20, 21) for supporting said transmission pinions (11), and which is movable with respect to the supporting structure (2) and rigid to maintain said second axes (18) in fixed relative positions; and angular connecting means (26, 32) interposed between said supporting structure (2) said supporting frame (20, 21) to maintain the supporting frame (20, 21) in an angularly fixed position with respect to said supporting structure (2) and about said first axis (3).

2. An assembly as claimed in claim 1, characterized in that said connecting means (19) also comprise first connecting means (26, 32) for connecting said supporting frame (20, 21) to said supporting structure (2) in sliding manner at least in a first direction substantially parallel to said first axis (3).

3. An assembly as claimed in claim 1, characterized in that said connecting means (19) also comprise second connecting means (26, 32) for connecting said supporting frame (20, 21) to said supporting structure (2) in sliding manner in at least a second direction crosswise to said first axis (3).

4. An assembly as claimed in claim 1, characterized in that said second axes (18) lie in one surface (P), and said connecting means (19) comprise a rocking-enabling connecting means (26, 32) for enabling said surface (P) to rock about at least one axis crosswise to said first axis (3).

5. An assembly as claimed in claim 4, characterized in that said surface (P) is a plane surface.

6. An assembly as claimed in claim 1, characterized in that said angular connecting means (26, 32) are defined by a single elastically flexible body (26).

7. An assembly as claimed in claim 6, characterized in that said supporting frame (20, 21) and said elastically flexible body (26) are aligned with each other along said first axis (3).

8. An assembly as claimed in claim 6, characterized in that said elastically flexible body (26) is a tubular body extending coaxially with said first axis (3) and comprising an end portion (29) connected integrally to said supporting structure (2).

9. An assembly as claimed in claim 6, characterized in that said elastically flexible body (26) comprises at least one bellows portion (27).

10. An assembly as claimed in claim 1, characterized in that said second axes (18) are perfectly equally spaced angularly.

11. An assembly as claimed in claim 10, characterized by comprising a number of said transmission pinions (11) perfectly equally spaced angularly.

12. An assembly as claimed in claim 11, characterized by comprising three of said transmission pinions (11) arranged exactly 120° apart.

13. A face gear transmission assembly (1) for aircraft application, comprising:

a supporting structure (2);

a pair of face gears (4)(5) facing each other and rotating with respect to the supporting structure (2) about a respective first axis (3);

at least one input pinion (10) and at least two transmission pinions (11) rotating about respective second axes (18) and meshing with both the face gears (4)(5); and an auxiliary supporting frame (20, 21) for supporting said transmission pinions (11) and connecting said transmission pinions (11) to said supporting structure (2), the auxiliary supporting frame (20, 21) being rigid to maintain said second axes (18) in fixed relative circumferential positions with respect to each other, the auxiliary supporting frame (20,21) being circumferentially fixed with respect to said supporting structure (2) and about said first axis (3), the auxiliary supporting structure (2) being angularly movable with respect to the supporting structure (2).

* * * * *